(12) United States Patent
Norris et al.

(10) Patent No.: US 8,935,912 B2
(45) Date of Patent: Jan. 20, 2015

(54) GAS TURBINE ENGINE WITH VARIABLE OVERALL PRESSURE RATIO

(75) Inventors: James W. Norris, Lebanon, CT (US);
Daniel B. Kupratis, Wallingford, CT (US); Gary M. Stetson, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 450 days.

(21) Appl. No.: 13/316,058

(22) Filed: Dec. 9, 2011

(65) Prior Publication Data

US 2013/0145769 A1 Jun. 13, 2013

(51) Int. Cl.
*F02C 1/06* (2006.01)
*F02C 9/00* (2006.01)
*F02K 3/02* (2006.01)

(52) U.S. Cl.
USPC .......................... 60/39.163; 60/226.1; 60/773

(58) Field of Classification Search
USPC .............. 60/39.163, 262, 226.1, 773
See application file for complete search history.

(56) References Cited

U.S. PATENT DOCUMENTS

| 2,504,181 | A | * | 4/1950 | Constant ...................... 60/226.1 |
| 4,007,892 | A | | 2/1977 | Tabor |
| 4,222,235 | A | | 9/1980 | Adamson et al. |
| 5,105,618 | A | * | 4/1992 | Lardellier .................... 60/226.1 |
| 6,134,880 | A | * | 10/2000 | Yoshinaka .................... 60/226.1 |
| 2005/0060983 | A1 | * | 3/2005 | Lardellier .................... 60/226.1 |
| 2010/0154383 | A1 | | 6/2010 | Ress, Jr. |
| 2010/0223903 | A1 | | 9/2010 | Starr |
| 2011/0056208 | A1 | | 3/2011 | Norris et al. |

FOREIGN PATENT DOCUMENTS

GB 390448 4/1933

* cited by examiner

*Primary Examiner* — Gerald L Sung
(74) *Attorney, Agent, or Firm* — Miller, Matthias & Hull LLP

(57) ABSTRACT

A gas turbine engine has a variable overall pressure rate ("OPR"). The engine includes a high pressure compressor having at least a primary stage having a set of primary rotors and a secondary stage having a set of secondary rotors. A clutch is provided to selectively engage the secondary rotors with the primary rotors. Engagement of the clutch may be controlled based on the vehicle travel mode, such as disengaging during a takeoff mode to reduce turbine entry temperature and engaging during a loiter mode to increase OPR.

23 Claims, 3 Drawing Sheets

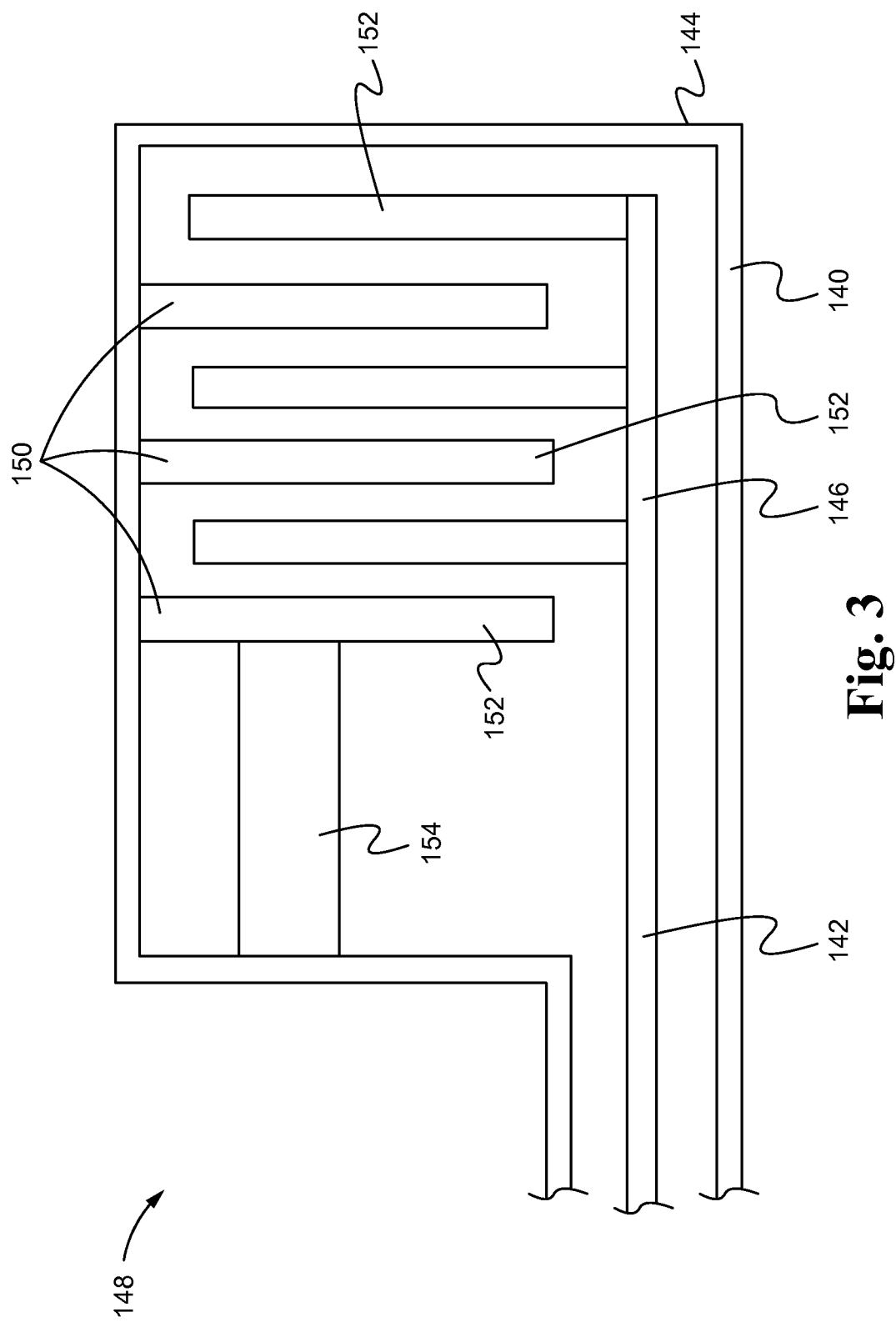

GAS TURBINE ENGINE WITH VARIABLE OVERALL PRESSURE RATIO

FIELD OF THE DISCLOSURE

The present disclosure generally relates to gas turbine engines and, more particularly, to apparatus and methods for providing a variable overall pressure ratio in a gas turbine engine.

BACKGROUND OF THE DISCLOSURE

Gas turbine engines are commonly used to propel aircraft. The efficiency and performance of the gas turbine engine may vary according to the form of the engine and the flight parameters of the aircraft. In general, however, the operating efficiency of conventional gas turbine engines used in aircraft is not optimized throughout the flight envelope. More specifically, the operating efficiency typically includes several components, such as propulsive efficiency and thermal efficiency, that peak at different power settings. The overall pressure ratio (OPR) of a gas turbine engine can influence when peak propulsive or thermal efficiency is reached. In most conventional aircraft, OPR is fixed and therefore the efficiency components typically peak at different power settings.

More recently, variable pressure ratio engines have been proposed in an effort to better coordinate peak propulsive and thermal efficiencies. For example, United States Patent Application Publication No. 2010/0223903 A1 to Starr, published on Sep. 9, 2010, discloses a variable pressure ratio compressor for a gas turbine engine in which rear stages of the compressor may be selectively engaged to increase the pressure ratio. The engine includes an air bypass and a valve controlling access to the bypass. When the rear stages are engaged, the valve is closed so that air flow is directed through the rear stages. Alternatively, when the rear stages are disengaged, the valve is opened to divert air flow around the rear stages. Significantly, the Starr '903 application discloses a clutch for selectively engaging the rear stages that is positioned between the forward and rear compressor stages, which is proximate the combustor. Consequently, the clutch is exposed to temperatures as high as approximately 1000° F., which necessitates the use of high temperature clutch components, thereby increasing the cost of the compressor. Additionally, only a limited space is available at that location, and therefore the assembly proposed in the Starr '903 application appears impractical.

SUMMARY OF THE DISCLOSURE

In accordance with one aspect of the disclosure, a gas turbine engine is provided having a low pressure spool that includes a low pressure compressor configured for a rearward air flow, and a low pressure turbine disposed aft of the low pressure compressor and configured for a forward air flow. A high pressure spool is disposed aft of the low pressure spool and includes a high pressure turbine disposed aft of the low pressure turbine and configured for a forward air flow, a combustor disposed aft of the high pressure turbine, and a high pressure compressor disposed aft of the combustor and configured for a forward air flow, the high pressure compressor including a primary stage, including a set of primary rotors, and a secondary stage, including a set of secondary rotors, wherein the primary stage is disposed aft of the secondary stage. A clutch is configured to selectively engage the primary and secondary stages and is disposed aft of the high pressure compressor.

In another aspect of the disclosure that may be combined with any of these aspects, a gas turbine engine is provided having a low pressure spool including a first fan configured for a rearward air flow, an intermediate pressure turbine disposed aft of the first fan and configured for a forward air flow, and a first shaft coupled to the first fan and the intermediate pressure turbine. An intermediate pressure spool includes a second fan disposed aft of the first fan and configured for a rearward air flow, an intermediate pressure compressor disposed aft of the second fan and configured for a rearward air flow, a low pressure turbine disposed aft of the intermediate pressure compressor and forward of the intermediate pressure turbine, the low pressure turbine configured for a forward air flow, and a second shaft coupled to the second fan, the intermediate pressure compressor, and the low pressure turbine. A high pressure spool is disposed aft of the low pressure spool and the intermediate pressure spool and includes a high pressure turbine disposed aft of the intermediate pressure turbine and configured for a forward air flow, a combustor disposed aft of the high pressure turbine, a high pressure compressor disposed aft of the combustor and configured for a forward air flow, the high pressure compressor including a primary stage, including a set of primary rotors, and a secondary stage, including a set of secondary rotors, wherein the primary stage is disposed aft of the secondary stage, a primary shaft coupled to the high pressure turbine and the primary stage of the high pressure compressor, and a secondary shaft coupled to the secondary stage of the high pressure compressor. A clutch is configured to selectively engage the primary and secondary stages, the clutch disposed aft of the high pressure compressor In another aspect of the disclosure that may be combined with any of these aspects, a method of operating a gas turbine engine for an aircraft having a takeoff mode and a loiter mode may include providing a low pressure spool having a low pressure compressor and a low pressure turbine disposed aft of the low pressure compressor, providing a high pressure spool disposed aft of the low pressure spool and including a high pressure turbine disposed aft of the low pressure turbine, a combustor disposed aft of the high pressure turbine, and a high pressure compressor disposed aft of the combustor, the high pressure compressor including a primary stage, including a set of primary rotors, and a secondary stage, including a set of secondary rotors, wherein the primary stage is disposed aft of the secondary stage, and providing a clutch configured to selectively engage the primary and secondary stages, the clutch disposed aft of the high pressure compressor. An axially rearward flow of fan air may be generated with a fan drive gear system, and the fan air may be split into a low pressure fan air flow directed rearward and into an exhaust duct, and a core air flow directed rearward into the low pressure compressor. The core air flow from the low pressure compressor may be directed into a reverse flow duct to produce an axially forward flow of core air. The forward flow of core air may be directed sequentially through the high pressure compressor, the combustor, the high pressure turbine, and the low pressure turbine to produce exhaust gas. The exhaust gas may be vented into the exhaust duct. The clutch may be disengaged when the aircraft is in the takeoff mode and engaged when the aircraft is in the loiter mode.

In another aspect of the disclosure that may be combined with any of these aspects, the high pressure spool includes a primary shaft coupled to the high pressure turbine and the primary rotors of the high pressure compressor, and a secondary shaft coupled to the secondary rotors of the high pressure compressor.

In another aspect of the disclosure that may be combined with any of these aspects, the clutch selectively engages the secondary shaft to the primary shaft, thereby to selectively engage the secondary stage to the primary stage.

In another aspect of the disclosure that may be combined with any of these aspects, the primary shaft includes an aft end, the secondary shaft includes an aft end, and the clutch is disposed adjacent the aft ends of the primary and secondary shafts.

In another aspect of the disclosure that may be combined with any of these aspects, the gas turbine engine further comprises a compressor diffuser configured to fluidly communicate from the high pressure compressor primary stage to the combustor, thereby producing a bypass flow around the high pressure compressor secondary stage.

In another aspect of the disclosure that may be combined with any of these aspects, the set of secondary rotors comprises at least two secondary rotors.

In another aspect of the disclosure that may be combined with any of these aspects, the gas turbine engine further comprises a generator directly coupled to the primary shaft.

In another aspect of the disclosure that may be combined with any of these aspects, the generator is disposed aft of the clutch.

In another aspect of the disclosure that may be combined with any of these aspects, the gas turbine engine further comprises a controller operatively coupled to the clutch, the controller having a loiter mode in which the clutch is engaged and a takeoff mode in which the clutch is disengaged.

In another aspect of the disclosure that may be combined with any of these aspects, the gas turbine engine further comprises a fan coupled to the low pressure spool by a fan drive gear system.

In another aspect of the disclosure that may be combined with any of these aspects, the gas turbine engine further comprises an intermediate pressure spool disposed forward of the high pressure spool, the intermediate pressure spool including an intermediate pressure compressor configured for a rearward air flow, and an intermediate pressure turbine disposed aft of the intermediate pressure compressor and configured for a forward air flow.

In another aspect of the disclosure that may be combined with any of these aspects, further comprising, subsequent to splitting the fan air into the low pressure fan air flow and the core air flow, separating a high pressure fan air flow from the core air flow, wherein the high pressure fan air flow is directed rearward.

BRIEF DESCRIPTION OF THE DRAWINGS

FIG. 3 is an enlarged schematic illustration of a clutch used in the gas turbine engine of FIG. 2.

Figure 1:
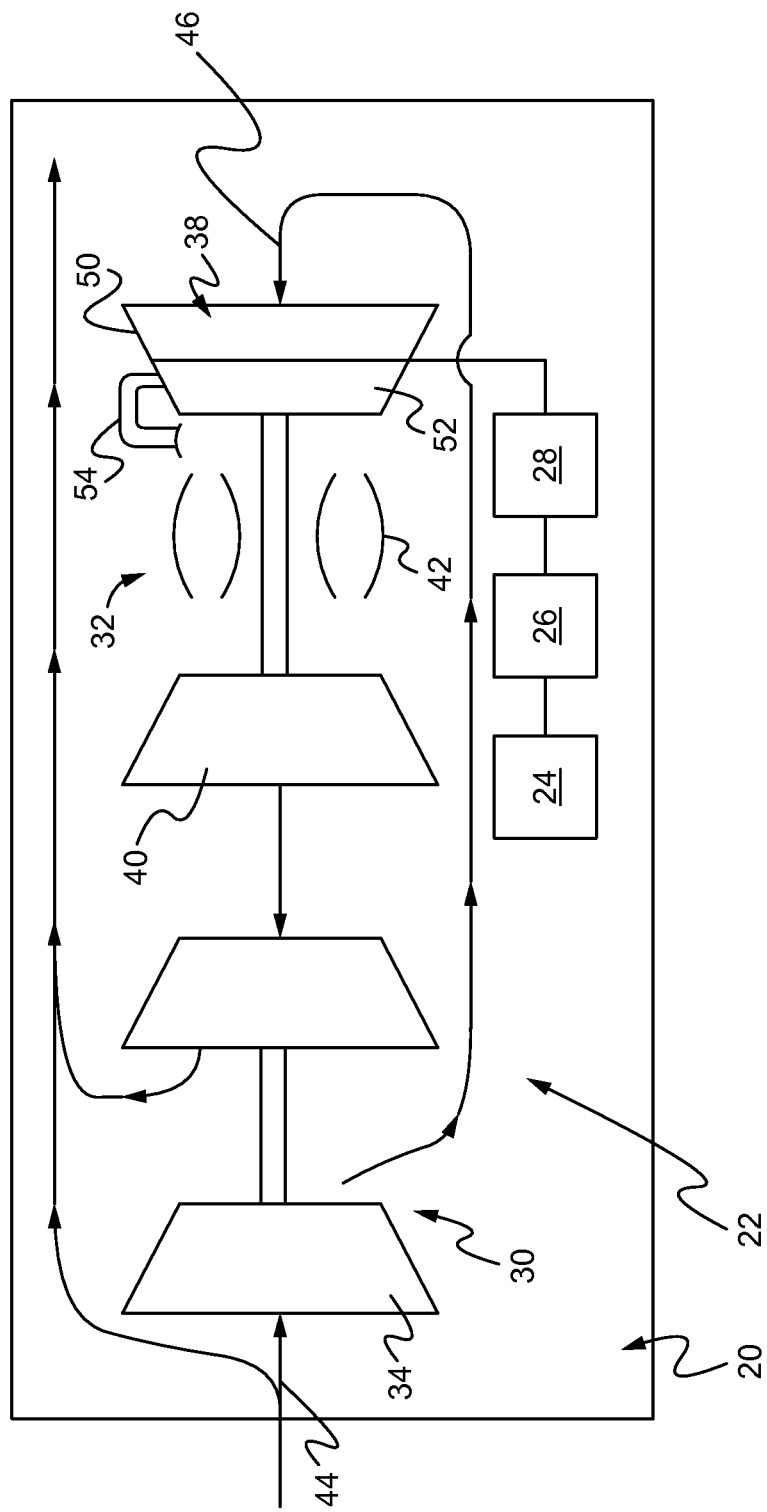
FIG. 1 is a schematic illustration of an aircraft including a gas turbine engine according to one embodiment of the present disclosure.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Exemplary embodiments of gas turbine engines having a variable overall pressure rate ("OPR") are disclosed herein. Each of the engines includes a high pressure compressor having at least a primary stage having a set of primary rotors and a secondary stage having a set of secondary rotors. A clutch is provided to selectively engage the secondary rotors with the primary rotors. During operation of a vehicle having one of the exemplary gas turbine engines, engagement of the clutch may be controlled based on the vehicle travel mode. On an aircraft, for example, the clutch may be disengaged during a takeoff mode and engaged during a loiter mode. Under high thrust conditions during takeoff, the clutch may be disengaged to depower the secondary stage of the high pressure compressor, thereby reducing turbine entry temperature ("T3"). By disengaging the secondary stage of the high pressure compressor, OPR is also reduced. Conversely, when the aircraft is at altitude and cruising in the loiter mode, the clutch may be engaged to power the secondary stage of the high pressure compressor, which increases OPR and thermal efficiency, and reduces core size. Accordingly, the OPR of the engine may be adjusted to optimize propulsive and thermal efficiencies during different modes of operation, thereby reducing fuel consumption. It is to be understood that the gas turbine engines described herein are for illustrative purposes only and to present background for some of the various components of a general turbine engine. Other components of a turbine engine unnecessary for an understanding of the present disclosure are not described.

In this disclosure, positions and directions are described relative to the general direction of air flow through a gas turbine engine. More specifically, the gas turbine engine has an inlet through which air enters the gas turbine engine and an outlet, generally positioned opposite the inlet, through which air exits the gas turbine engine. As used herein, the inlet defines a "front" or "forward" portion of the engine, while the outlet defines an "aft" or "rearward" portion of the engine. Accordingly, when a subject component is described as being "forward" of another reference component or point, the subject component is positioned closer to the inlet of the engine than the reference component or point. Conversely, when a subject component is described as being "rearward" or "aft" another reference component or point, the subject component is positioned closer to the outlet of the engine than the reference component or point. Similarly, air flow directions are identified using "rearward," which means in the general direction from the inlet to the outlet of the engine, and "forward," which means in the general direction from the outlet to the inlet of the engine.

Referring now to FIG. 1, a schematic illustration of an aircraft 20 is shown having a gas turbine engine 22, a flight condition sensor 24, a controller 26, and a clutch 28. The aircraft 20 may take any variety of forms, including but not limited to helicopters, airplanes, unmanned space vehicles, rotary wing vehicles, and hover crafts. Additionally, the gas turbine engines disclosed herein may be used in other applications that do not involve aircraft, such as, for example, maritime propulsion and other applications known to one of ordinary skill in the art.

The gas turbine engine 22 includes a first or low pressure spool 30 and a second or high pressure spool 32 disposed aft the low pressure spool 30. The low pressure spool 30 includes a low pressure compressor 34 configured for a rearward air flow and a low pressure turbine 36 configured for a forward air flow. The high pressure spool 32 includes a high pressure compressor 38 and a high pressure turbine 40, both of which are configured for a forward air flow. A combustor 42 is positioned between the high pressure compressor 38 and the high pressure turbine 40. Ducting is provided to direct a rearward flowing air flow 44 into the low pressure compressor

34. A reverse flow duct is provided having an inlet located downstream of the low pressure compressor 34 for routing the air flow around the other gas turbine engine components and redirecting the air flow in a forward direction. Forwardly flowing air flow 46 then passes sequentially through the high pressure compressor 38, the combustor 42, the high pressure turbine 40, and the low pressure turbine 36, before being routed to a rearward flowing exhaust air flow 48.

The high pressure compressor 38 includes a primary stage 50 including a set of primary rotors and a secondary stage 52 including a set of secondary rotors. The clutch 28 selectively engages the secondary stage 52 to the primary stage 50 based on a clutch signal provided by the controller 26. The controller 26 may be communicatively coupled to the flight condition sensor 24 to receive a flight condition signal. Based on the flight condition signal, the controller 26 may determine whether to send a clutch engage or a clutch disengage signal. For example, when the flight condition signal indicates that the aircraft 20 is in a takeoff mode, the controller 26 may generate a clutch disengage signal, thereby depowering the secondary stage 52 of the high pressure compressor 38. Alternatively, the flight condition signal may indicate that the aircraft 20 is in a loiter mode, in which case the controller 26 generates a clutch engage signal to power the secondary stage 52. In one embodiment, the flight condition signal may include a T3 signal indicating a sensed turbine entry temperature and a power demand signal indicating the amount of power requested from the engine, and the engine 22 is controlled based on these signals. An optional high pressure compressor bypass 54 may be provided for directing air around the secondary stage 52 when the secondary stage 52 is depowered.

The flight condition sensor 24 measures aircraft flight conditions such as speed and altitude, for example, and may output any variety of data whether sensed or calculated. For example, the flight condition sensor 24 may sense and output conditions such as static temperature, static pressure, total temperature, and/or total pressure, among others. In addition, the flight condition sensor 24 may output calculated values such as equivalent airspeed, altitude, and Mach number, to name a few examples. Any number of other sensed conditions or calculated values may also be output. The flight condition sensor 24 provides data to the controller 26 and may output values in either analog or digital form.

The controller 26 is typically positioned in an avionics bay and may be a single component or a collection of operatively coupled components. The controller 26 may be comprised of digital circuitry, analog circuitry, or a hybrid combination of both. Also, the controller 26 may be programmable, an integrated state machine, or a hybrid combination thereof. The controller 26 may include one or more Arithmetic Logic Units (ALUs), Central Processing Units (CPUs), memories, limiters, conditioners, filters, format converters, or the like. In one form, the controller 26 is programmable and executes algorithms and processes data according to operating logic defined by programming instructions, such as software and firmware. Alternatively or additionally, operating logic for the controller 26 may be at least partially defined by hard-wired logic or other hardware. In one form, the controller 26 is configured to operate as a Full Authority Digital Engine Control (FADEC); however in other embodiments it may be configured in a different manner. The controller may be exclusively dedicated to control of the clutch 28, or may further be used to regulate, control, and/or activate one or more other subsystems or aspects of the aircraft 20 or gas turbine engine 22.

The gas turbine engine 22 illustrated in FIG. 1 is depicted as a turbojet engine, but may take on other forms in other embodiments, such as, for example, turbofans, turboshafts, and turboprops. In addition, the gas turbine engine 22 may also be integrated into a high speed propulsion system that may include a ramjet or scramjet. In some forms, the gas turbine engine 22 may be operated as an adaptive or variable cycle engine. Furthermore, the gas turbine engine 22 may incorporate combustors such as pulse detonation combustors or wave rotor combustors. Still further, the rotating turbomachinery such as the compressors and turbines may incorporate active tip clearance control and may have variable geometry.

Figure 2:
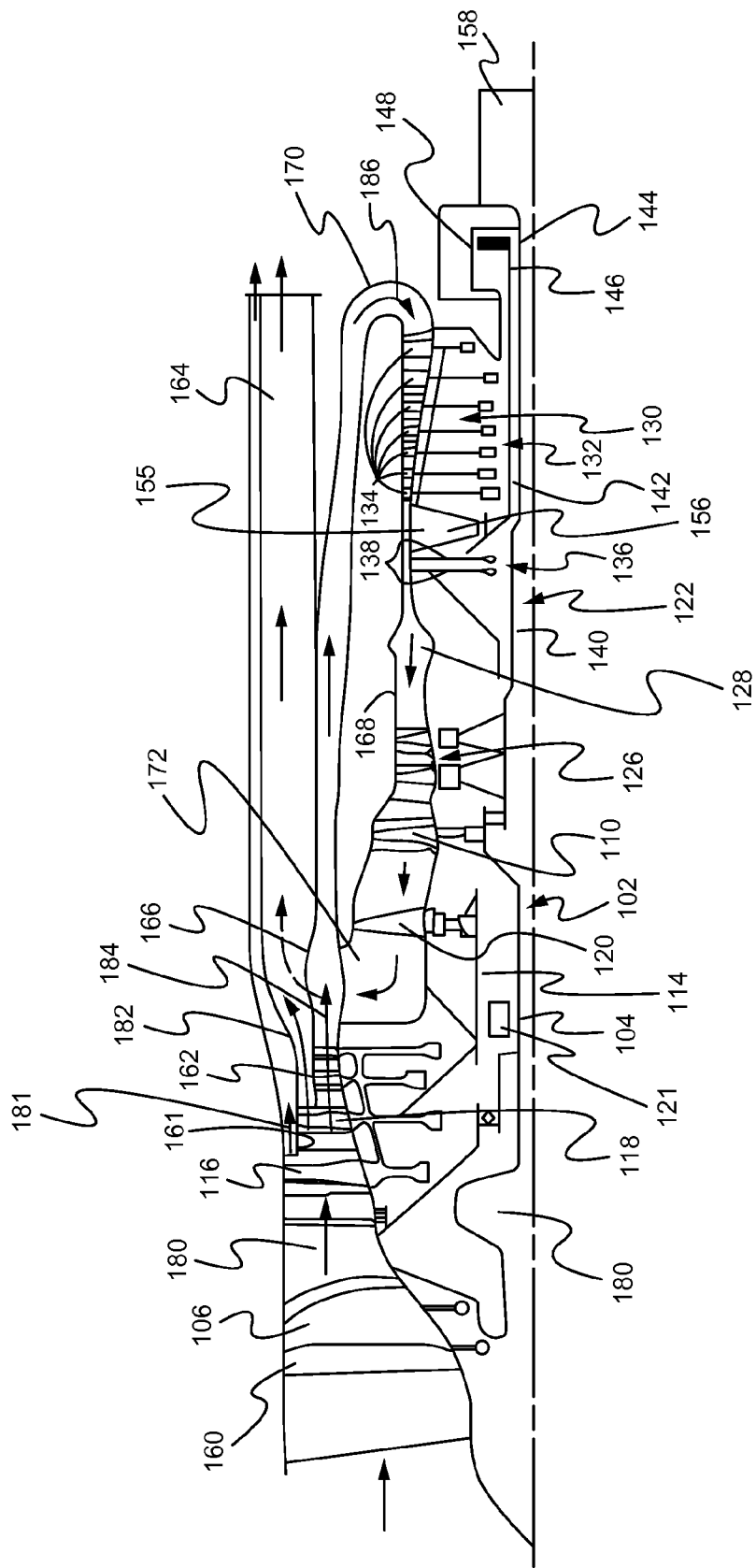
FIG. 2 is a schematic illustration of a gas turbine engine according to another embodiment of the present disclosure.

FIG. 2 illustrates an alternative embodiment of a gas turbine engine 100 constructed according to the present disclosure. The gas turbine engine 100 includes a low pressure spool 102 including a first shaft 104 coupled to a first fan 106 directly, or via a fan drive gear system 108. An intermediate pressure turbine 110 is also coupled to the first shaft 104 and is disposed aft of the first fan 106. As understood more fully below, the first fan 106 is configured for a rearward air flow while the intermediate pressure turbine 110 is configured for a forward air flow. One or more optional generators 121 may be operatively coupled to the low pressure spool 102 to share power during some portions of the flight envelope.

The engine 100 may also include an intermediate pressure spool 111 having a second shaft 114. A second fan 116 is coupled to the second shaft 114, is disposed aft of the first fan 106, and is configured for a rearward air flow. An intermediate pressure compressor 118 is also coupled to the second shaft 114, is disposed aft of the second fan 116, and is configured for a rearward air flow. A low pressure turbine 120 is coupled to the second shaft 114, is disposed aft of the intermediate pressure compressor 118 and forward of the intermediate pressure turbine 110, and is configured for a forward air flow.

In addition, the gas turbine engine 100 includes a high pressure spool 122 disposed generally aft of the low pressure spool 102. The high pressure spool 122 includes a high pressure turbine 126 disposed aft of the intermediate pressure turbine 110 and configured for a forward air flow, and a high pressure compressor 130 disposed aft of the high pressure turbine 126 and configured for a forward air flow. A combustor 128 is disposed between the high pressure compressor 130 and the high pressure turbine 126. In an exemplary embodiment, the combustor 128 is a dual dome combustor with dual diffusers, however other types of combustors may be used without departing from the scope of this disclosure.

The high pressure compressor 130 includes a primary stage 132, including a set of primary rotors 134, and a secondary stage 136, including a set of secondary rotors 138, wherein the primary stage 132 is disposed aft of the secondary stage 136. While the embodiment illustrated in FIG. 2 shows the primary stage 132 including seven rows of primary rotors 134 and the secondary stage 136 including two rows of secondary rotors 138, it will be appreciated that more or less rows of rotors may be provided in the stages.

A primary shaft 140 is coupled to the high pressure turbine 126 and the secondary stage 136 of the high pressure compressor 130. A secondary shaft 142 is coupled to the secondary stage 136 of the high pressure compressor 130. The primary and secondary shafts 140, 142 have respective aft ends 144, 146 disposed aft of the high pressure compressor 130.

A clutch 148 is provided to selectively engage the secondary stage 136 to the primary stage 132. As best shown in FIG. 3, the clutch 148 may include a first set of clutch plates 150 coupled to the aft end 144 of the primary shaft 140 and a second set of clutch plates 152 coupled to the aft end 146 of the secondary shaft 142. A clutch actuator 154 is operatively coupled to the clutch plates 150, 152 to mechanically engage or disengage the clutch plates 150, 152. When the clutch plates 150, 152 are engaged, the secondary shaft 142 rotates with the primary shaft 140 so that both the primary and secondary stages 132, 136 of the high pressure compressor 130 are powered. When the clutch plates 150, 152 are disengaged, the secondary shaft 142 may rotate relative to the primary shaft 140 and the secondary stage 136 is depowered. The location of the clutch 148, at the aft ends 144, 146 of the primary and secondary shafts 140, 142, which are aft of the high pressure compressor 130, spaces it away from the combustor 128 in a lower temperatures area. Additionally, by placing it at the aft end of the reverse flow gas turbine engine 100, the clutch 148 need not be located between engine components and therefore adequate space is provided.

A high pressure compressor diffuser 155 may optionally be provided to bypass air flow around the secondary stage 136 when the secondary stage 136 is depowered. As best shown in FIG. 2, the high pressure compressor diffuser 155 is located at an intermediate case 156 disposed between the primary and secondary stages 132, 136. The diffuser 155 diverts air flow around the secondary stage 136 to the combustor 128.

A generator 158 may be operatively coupled to the primary shaft 140. The generator 158 may be directly coupled to the primary shaft 140 as shown, without an intervening gear box, so that the generator 158 is directly driven by the primary shaft 140. This directly coupled arrangement permits the use of all electric architecture in the aircraft. In the illustrated embodiment, the generator 158 is disposed aft of the clutch 148. Alternatively, the generator 158 may be located forward of the clutch 148.

A controller (not shown), such as controller 26 described above in connection with the embodiment of FIG. 1, may be operatively coupled to the clutch 148. As noted above, the controller may engage or disengage the clutch based on aircraft flight condition or other sensed or calculated parameters.

Appropriate structure is provided to direct air flows through the gas turbine engine 100. Accordingly, the gas turbine engine 100 include a fan case 160, first and second flow splitters 161, 162, an exhaust duct 164, a compressor case 166, a core engine case 168, a reverse duct 170, and an exhaust pipe 172 for directing air exiting the intermediate pressure turbine 110 into the exhaust duct 164. The fan case 160 surrounds the blades of the first and second fans 106, 116 to direct an inlet air flow 180 in a rearward direction. The exhaust duct 164 extends from the fan case 160 to the rear of the engine 100. The first flow splitter 161 is axially positioned between the second fan 116 and a forward end of the intermediate pressure compressor 118 to separate a low pressure fan flow 181 from the inlet air flow 180. The second flow splitter 162 is axially positioned mid-way along the intermediate pressure compressor 118 to divide the inlet air flow 180 into a high pressure fan flow 182 and a core air flow 184. The reverse duct 170 reverses the rearward directed core air flow 184 exiting the intermediate pressure compressor 118 to provide a forwardly directed core air flow 186 that travels through the high pressure compressor 130, combustor 128, high pressure turbine 126, and intermediate pressure turbine 110. The exhaust pipe 172 directs the core air flow exiting the intermediate pressure turbine 110 into the exhaust duct 164.

While the exemplary gas turbine engine 100 is shown in FIG. 2 as having three spools, it is contemplated that the engine 100 may employ only two spools or more than three spools without departing from this disclosure. An exemplary two spool embodiment may be provided by coupling the first shaft 104 to the second shaft 114 so that the rotate together, however other two (and three) spool configurations may be employed. In general, one or more spools may be located to the front of the gas turbine engine 100, while a single high pressure spool may be located to the rear of the engine. Furthermore, a fan drive gear system may be provided for higher bypass configurations.

INDUSTRIAL APPLICABILITY

The gas turbine engines disclosed herein may be used to propel vehicles, such as aircrafts, and the like. The use of high pressure compressors having multiple stages that can be engaged or disengaged allows for better management of OPR and T3 during different modes of aircraft operation. Specifically, the secondary stage of the high pressure compressor may be disengaged during takeoff, thereby to reduce T3. When the secondary stage is disengaged, it may be permitted to free wheel. Power may be extracted from the free-wheeling secondary stage to drive propulsors, thereby further reducing T3. Some air flow may be bypassed through the high pressure compressor diffuser to reduce losses. During cruise or loiter operation of the aircraft, the secondary stage may be engaged to increase OPR and reduce core size, thereby increasing fuel efficiency. The clutch provided to engage and disengage the secondary stage may be advantageously located in a low temperature area with minimal space limitations. Specifically, by using a gas turbine engine with a reverse-flow core, the clutch may be positioned aft of the high pressure compressor and away from the combustor. This location not only has a lower temperature, but does not impose space limitations by requiring the clutch to be disposed between compressor components.

While only certain embodiments have been set forth, alternatives and modifications will be apparent from the above description to those skilled in the art. These and other alternatives are considered equivalents and within the spirit and scope of this disclosure.

What is claimed is:
1. A gas turbine engine, comprising:
   a low pressure spool including:
      a low pressure compressor configured for a rearward air flow; and
      a low pressure turbine disposed aft of the low pressure compressor and configured for a forward air flow;
   a high pressure spool disposed aft of the low pressure spool and including:
      a high pressure turbine disposed aft of the low pressure turbine and configured for a forward air flow;
      a combustor disposed aft of the high pressure turbine; and
      a high pressure compressor disposed aft of the combustor and configured for a forward air flow, the high pressure compressor including a primary stage, including a set of primary rotors, and a secondary stage, including a set of secondary rotors, wherein the primary stage is disposed aft of the secondary stage; and
   a clutch configured to selectively engage the primary and secondary stages, the clutch disposed aft of the high pressure compressor.

2. The gas turbine engine of claim 1, in which the high pressure spool includes a primary shaft coupled to the high pressure turbine and the primary rotors of the high pressure compressor, and a secondary shaft coupled to the secondary rotors of the high pressure compressor.

3. The gas turbine engine of claim 2, in which the clutch selectively engages the secondary shaft to the primary shaft, thereby to selectively engage the secondary stage to the primary stage.

4. The gas turbine engine of claim 3, in which the primary shaft includes an aft end, the secondary shaft includes an aft end, and the clutch is disposed adjacent the aft ends of the primary and secondary shafts.

5. The gas turbine engine of claim 1, further comprising a compressor diffuser configured to fluidly communicate from the high pressure compressor primary stage to the combustor, thereby producing a bypass flow around the high pressure compressor secondary stage.

6. The gas turbine engine of claim 1, in which the set of secondary rotors comprises at least two secondary rotors.

7. The gas turbine engine of claim 1, further comprising a generator directly coupled to the high pressure spool.

8. The gas turbine engine of claim 7, in which the generator is disposed aft of the clutch.

9. The gas turbine engine of claim 1, further comprising a controller operatively coupled to the clutch, the controller having a loiter mode in which the clutch is engaged and a takeoff mode in which the clutch is disengaged.

10. The gas turbine engine of claim 1, further comprising a fan coupled to the low pressure spool by a fan drive gear system.

11. The gas turbine engine of claim 1, further comprising an intermediate pressure spool disposed forward of the high pressure spool, the intermediate pressure spool including an intermediate pressure compressor configured for a rearward air flow, and an intermediate pressure turbine disposed aft of the intermediate pressure compressor and configured for a forward air flow.

12. A gas turbine engine, comprising:
a low pressure spool including a first fan configured for a rearward air flow, an intermediate pressure turbine disposed aft of the first fan and configured for a forward air flow, and a first shaft coupled to the first fan and the intermediate pressure turbine;
an intermediate pressure spool including a second fan disposed aft of the first fan and configured for a rearward air flow, an intermediate pressure compressor disposed aft of the second fan and configured for a rearward air flow, a low pressure turbine disposed aft of the intermediate pressure compressor and forward of the intermediate pressure turbine, the low pressure turbine configured for a forward air flow, and a second shaft coupled to the second fan, the intermediate pressure compressor, and the low pressure turbine;
a high pressure spool disposed aft of the low pressure spool and the intermediate pressure spool, and including:
a high pressure turbine disposed aft of the intermediate pressure turbine and configured for a forward air flow;
a combustor disposed aft of the high pressure turbine;
a high pressure compressor disposed aft of the combustor and configured for a forward air flow, the high pressure compressor including a primary stage, including a set of primary rotors, and a secondary stage, including a set of secondary rotors, wherein the primary stage is disposed aft of the secondary stage;
a primary shaft coupled to the high pressure turbine and the primary stage of the high pressure compressor; and
a secondary shaft coupled to the secondary stage of the high pressure compressor; and
a clutch configured to selectively engage the primary and secondary stages, the clutch disposed aft of the high pressure compressor.

13. The gas turbine engine of claim 12, in which the clutch selectively engages the secondary shaft to the primary shaft, thereby to selectively engage the secondary stage to the primary stage.

14. The gas turbine engine of claim 13, in which the primary shaft includes an aft end, the secondary shaft includes an aft end, and the clutch is disposed adjacent the aft ends of the primary and secondary shafts.

15. The gas turbine engine of claim 12, further comprising a high pressure compressor diffuser configured to fluidly communicate from the high pressure compressor primary stage to the combustor, thereby producing a bypass flow around the high pressure compressor secondary stage.

16. The gas turbine engine of claim 12, in which the set of secondary rotors comprises at least two secondary rotors.

17. The gas turbine engine of claim 12, further comprising a generator directly coupled to the primary shaft.

18. The gas turbine engine of claim 17, in which the generator is disposed aft of the clutch.

19. The gas turbine engine of claim 12, further comprising a controller operatively coupled to the clutch, the controller having a loiter mode in which the clutch is engaged and a takeoff mode in which the clutch is disengaged.

20. The gas turbine engine of claim 12, wherein the first fan is coupled to the low pressure spool by a fan drive gear system.

21. A method of operating a gas turbine engine for an aircraft having a takeoff mode and a loiter mode, the method comprising:
providing a low pressure spool having a low pressure compressor and a low pressure turbine disposed aft of the low pressure compressor;
providing a high pressure spool disposed aft of the low pressure spool and including a high pressure turbine disposed aft of the low pressure turbine, a combustor disposed aft of the high pressure turbine, and a high pressure compressor disposed aft of the combustor, the high pressure compressor including a primary stage, including a set of primary rotors, and a secondary stage, including a set of secondary rotors, wherein the primary stage is disposed aft of the secondary stage;
providing a clutch configured to selectively engage the primary and secondary stages, the clutch disposed aft of the high pressure compressor;
generating an axially rearward flow of fan air with a fan drive gear system;
splitting the fan air into a low pressure fan air flow directed rearward and into an exhaust duct, and a core air flow directed rearward into the low pressure compressor;
redirecting the core air flow from the low pressure compressor to a reverse flow duct to produce an axially forward flow of core air;
directing the forward flow of core air sequentially through the high pressure compressor, the combustor, the high pressure turbine, and the low pressure turbine to produce exhaust gas;
venting the exhaust gas into the exhaust duct;
disengaging the clutch when the aircraft is in the takeoff mode; and
engaging the clutch when the aircraft is in the loiter mode.

22. The method of claim 21, further comprising providing a compressor diffuser configured to fluidly communicate from the high pressure compressor primary stage to the combustor, thereby producing a bypass flow around the high pressure compressor secondary stage when the clutch is disengaged and the aircraft is in the takeoff mode.

23. The method of claim 21, further comprising, subsequent to splitting the fan air into the low pressure fan air flow and the core air flow, separating a high pressure fan air flow from the core air flow, wherein the high pressure fan air flow is directed rearward.

* * * * *